US010926698B2

(12) United States Patent
Gothekar et al.

(10) Patent No.: US 10,926,698 B2
(45) Date of Patent: Feb. 23, 2021

(54) INTEGRATED STEERING WHEEL, VIBRATION ABSORBER, AND DRIVER AIRBAG

(71) Applicant: Key Safety Systems, Inc., Sterling Heights, MI (US)

(72) Inventors: Abhishek Gothekar, Rochester Hills, MI (US); Byron Spencer, Bloomfield, MI (US); Roland Furtado, Novi, MI (US); Patrick O'Mara, Chesterfield, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 135 days.

(21) Appl. No.: 16/222,465

(22) Filed: Dec. 17, 2018

(65) Prior Publication Data

US 2020/0189657 A1 Jun. 18, 2020

(51) Int. Cl.
*B60R 21/203* (2006.01)
*B60Q 5/00* (2006.01)
(Continued)

(52) U.S. Cl.
CPC .......... *B60Q 5/003* (2013.01); *B60R 21/2037* (2013.01); *B62D 7/222* (2013.01); *F16F 1/3732* (2013.01)

(58) Field of Classification Search
CPC ... B60R 21/2037; B60R 32/303; B60Q 5/003; B62D 7/222
See application file for complete search history.

(56) References Cited

U.S. PATENT DOCUMENTS 5,380,037 A * 1/1995 Worrell .................. B60Q 5/003 200/61.55
5,410,114 A * 4/1995 Furuie .................... B60Q 5/003 200/61.55
(Continued)

FOREIGN PATENT DOCUMENTS

DE 10006893 A1 * 8/2001 ......... B60R 21/2037
DE 102014000587 A1 * 7/2015 ............. B60Q 5/003
(Continued)

OTHER PUBLICATIONS

Machine language translation of DE 102014000587 obtained from espacenet.com on Jun. 25, 2020.*

*Primary Examiner* — Ruth Ilan
(74) *Attorney, Agent, or Firm* — Meunier Carlin & Curfman LLC

(57) ABSTRACT

A steering wheel assembly (10) contains a dampening system for mitigating vibrations transferred from a vehicle to the steering wheel assembly (10). A plurality of damper spring elements or grommets or damper spring elements (22) are each retained within a corresponding steering wheel support member (330). An air bag module (14) is fixed to a steering wheel (18) while resting upon the damper spring elements (22) for eliminating and/or reducing lateral displacement/vibrations normally attendant to vehicle operation. A horn switch (16) containing a plurality of annular support members (76, 176) may be positioned over the damper spring elements (22), wherein each annular support member (76, 176) is coaxially aligned and positioned over a corresponding grommet (22) to also manage vertical displacement; the air bag module (14) is then fixed over the horn switch 16 and to the steering wheel (18). Movement of the airbag module can actuate the horn switch.

16 Claims, 8 Drawing Sheets

(51) Int. Cl.
*B62D 7/22* (2006.01)
*F16F 1/373* (2006.01)

(56) References Cited

U.S. PATENT DOCUMENTS

| | | | | |
|---|---|---|---|---|
| 6,082,758 | A * | 7/2000 | Schenck | B60Q 5/003 200/305 |
| 6,402,193 | B1 * | 6/2002 | Fleckenstein | B60Q 5/003 200/61.55 |
| 6,457,379 | B1 * | 10/2002 | Mirone | B60Q 5/003 200/61.54 |
| 6,478,330 | B2 * | 11/2002 | Fujita | B60Q 5/003 200/61.55 |
| 6,554,312 | B2 * | 4/2003 | Sakane | B60Q 5/003 280/728.2 |
| 6,793,237 | B2 * | 9/2004 | Derrick | B60R 21/2037 24/453 |
| 6,874,808 | B2 * | 4/2005 | Marath | B60Q 5/003 280/728.2 |
| 7,053,322 | B2 * | 5/2006 | Helmstetter | B60Q 1/0082 200/61.54 |
| 7,322,602 | B2 * | 1/2008 | Tsujimoto | B60Q 5/003 200/61.54 |
| 7,621,560 | B2 * | 11/2009 | Spencer | B60R 21/2037 200/61.54 |
| 8,286,766 | B2 * | 10/2012 | Terada | B60R 21/2037 188/379 |
| 8,567,818 | B2 | 10/2013 | Umemura et al. | |
| 8,720,942 | B2 * | 5/2014 | Onohara | B60R 21/2037 200/61.55 |
| 8,733,203 | B2 * | 5/2014 | Kondo | B60Q 5/003 280/731 |
| 8,794,662 | B2 * | 8/2014 | Ishii | B60R 21/2037 280/731 |
| 9,120,453 | B2 | 9/2015 | Obayashi et al. | |
| 9,403,552 | B2 * | 8/2016 | Onohara | B60R 21/2037 |
| 10,099,642 | B2 * | 10/2018 | Bachmann | B60R 21/2037 |
| 10,351,089 | B2 * | 7/2019 | Ishii | B60R 21/2037 |
| 2003/0197355 | A1 * | 10/2003 | Bohn | B60Q 5/003 280/731 |
| 2010/0219621 | A1 * | 9/2010 | Sasaki | B60Q 5/003 280/731 |
| 2013/0026741 | A1 * | 1/2013 | Onohara | B60R 21/2037 280/731 |
| 2013/0221641 | A1 * | 8/2013 | Kondo | B60R 21/2035 280/731 |
| 2014/0203539 | A1 * | 7/2014 | Bachmann | B62D 1/046 280/728.1 |
| 2015/0042079 | A1 * | 2/2015 | Ishii | B60Q 5/003 280/728.2 |
| 2017/0144594 | A1 * | 5/2017 | Obayashi | B62D 7/222 |
| 2017/0361801 | A1 * | 12/2017 | Banno | B60R 21/2037 |
| 2018/0029556 | A1 * | 2/2018 | Ishii | B60R 21/2037 |
| 2019/0047604 | A1 * | 2/2019 | Banno | B62D 1/046 |
| 2019/0217800 | A1 * | 7/2019 | McMillan | B60Q 5/003 |
| 2019/0225178 | A1 * | 7/2019 | Kolosick | B60R 21/203 |
| 2020/0043679 | A1 * | 2/2020 | Nonoyama | H01H 13/04 |
| 2020/0130630 | A1 * | 4/2020 | Schmeier | B60Q 5/003 |
| 2020/0148155 | A1 * | 5/2020 | Kwon | B60R 21/2037 |

FOREIGN PATENT DOCUMENTS

| | | | | |
|---|---|---|---|---|
| DE | 102014001821 | A1 * | 8/2015 | B60R 21/2037 |
| DE | 202018101635 | * | 5/2018 | |
| EP | 0785107 | A1 * | 7/1997 | B60R 21/05 |
| WO | 2016002507 | | 1/2016 | |

* cited by examiner

X - Vertical Displacement
Y - Lateral Displacement

INTEGRATED STEERING WHEEL, VIBRATION ABSORBER, AND DRIVER AIRBAG

FIELD OF THE INVENTION

The present invention relates to motor vehicle systems and more particularly to a method and apparatus for dampening a steering wheel assembly.

BACKGROUND AND SUMMARY OF THE INVENTION

Generally, motor vehicles are equipped with steering wheel assemblies that contain air bag modules, which serve to protect occupants in the motor vehicle during a collision event. Typically, these air bag modules are secured within the steering wheel, and the steering wheel is in turn secured to a shaft connected to the road wheels at the front end of the vehicle. The engine vibrations are also transmitted through the vehicle frame into the steering wheel via its attachment point to the wheel. As a result, the steering wheel is exposed to vibrations that occur due to operation of the vehicle. To enhance the comfort of the driver and minimize vibrations conveyed through contact with the steering wheel, mitigation of the vibrations oftentimes requires that a dampening system be employed within the steering wheel assembly. One challenge is to optimize the packaging space necessary for the dampening system, given that the airbag module occupies much of the available space within the steering wheel assembly. Yet another challenge is to reduce the weight of the dampening system. Accordingly, it is desirable to provide an improved method and apparatus for dampening of the vibrations conducted through the steering wheel.

The present invention provides a steering wheel assembly for a vehicle and is primarily directed to a dampening system operably communicating with the armature of the steering wheel. The assembly includes a dampening system contained within the armature that facilitates a suspended condition of an automotive component, such as a driver air bag module or assembly, relative to both vertical and lateral movement. As a result, the vibrations normally felt by the driver are mitigated by the designed movement of the airbag module within the steering wheel assembly. The assembly may further include a horn switch coupled to a steering wheel and the air bag module. The horn switch generates an electrical signal based on an input from the driver to activate the vehicle's horn. In sum, the dampening system is operably connected to the armature to attenuate the vibrations or frequencies otherwise transmitted to the steering wheel assembly as the vehicle is operated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be described by way of example and with reference to the accompanying drawings in which.

DETAILED DESCRIPTION OF THE INVENTION

The following description of various embodiments is merely exemplary in nature and is in no way intended to limit the invention, its application, or uses. Although the following description is related generally to an apparatus for dampening the vibrations that are typically conveyed through the steering wheel, it will be understood that this apparatus could be modified in a number of ways and still be used within a steering wheel assembly. Therefore, it will be understood that the following discussions are not intended to limit the scope of the appended claims.

With reference now to FIGS. 1 through 11, a steering wheel assembly 10 is shown for use with a motor vehicle. It will be appreciated that a related and exemplary steering wheel assembly is described in U.S. Pat. No. 7,533,897, the teachings of which are herein incorporated by reference in their entirety. The manufacture of steering wheel assemblies is known in the art, and therefore, various details and intricacies of how the constituents are joined together, apart from the inventive aspects of the present embodiments, are believed to be well-appreciated by those of ordinary skill.

Figure 1:
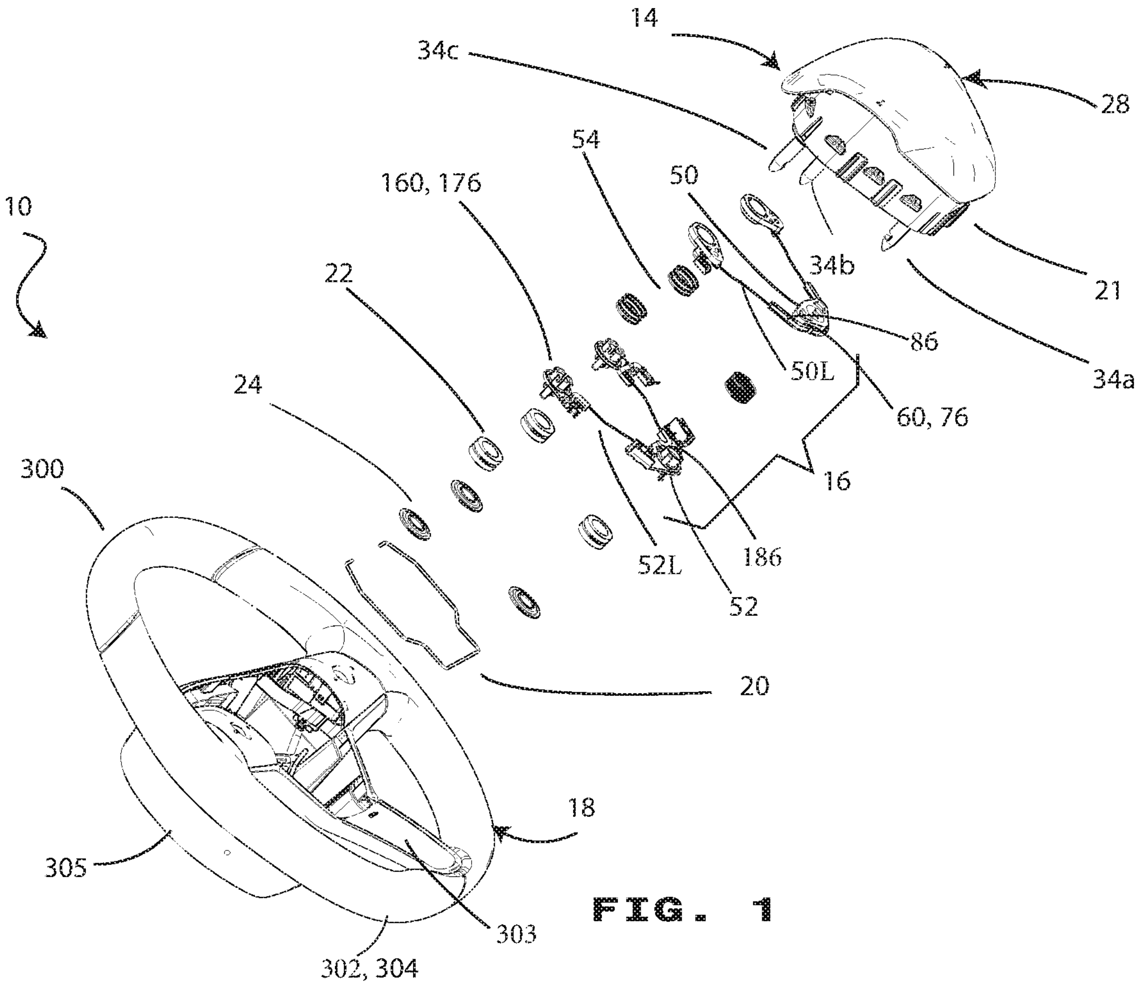
FIG. 1 is an exploded view of the steering wheel assembly, in accordance with the present invention.

The steering wheel assembly 10 may include an automotive component or air bag module 14, a horn switch 16 and a steering wheel 18. The steering wheel 18 comprises a metal armature 300 having spokes 303, a rim 304 and a hub connection 305, which connects the armature 300 to a steering shaft (not shown). The armature 300, covered by a foam and/or resin molded about the rim 304 of the armature 300, an over molded foam or separately molded back cover is often connected to the armature, a leather covering, and switches often comprise the complete steering wheel 18. In the illustrated embodiment the horn switch 16 is disposed between the air bag module 14 and the wheel 18, and the air bag module 14 is secured to the steering wheel armature 300 by an attachment mechanism 20 also referred to as a driver air bag module retainer wire or retaining member 20. As can be appreciated, the horn switch 16 can be located between any two cooperating members configured to squeeze the elements of the horn switch 16 together. As shown in the Figures to follow, and as further elaborated on below, a horn spring upper housing 50 and a horn spring lower housing 52 are two such cooperating members. As shown in FIG. 1, damper spring elements or grommets 22 and damper spring isolators or spacers 24 are shown between the horn switch 16 and the retaining member 20.

Figure 9:
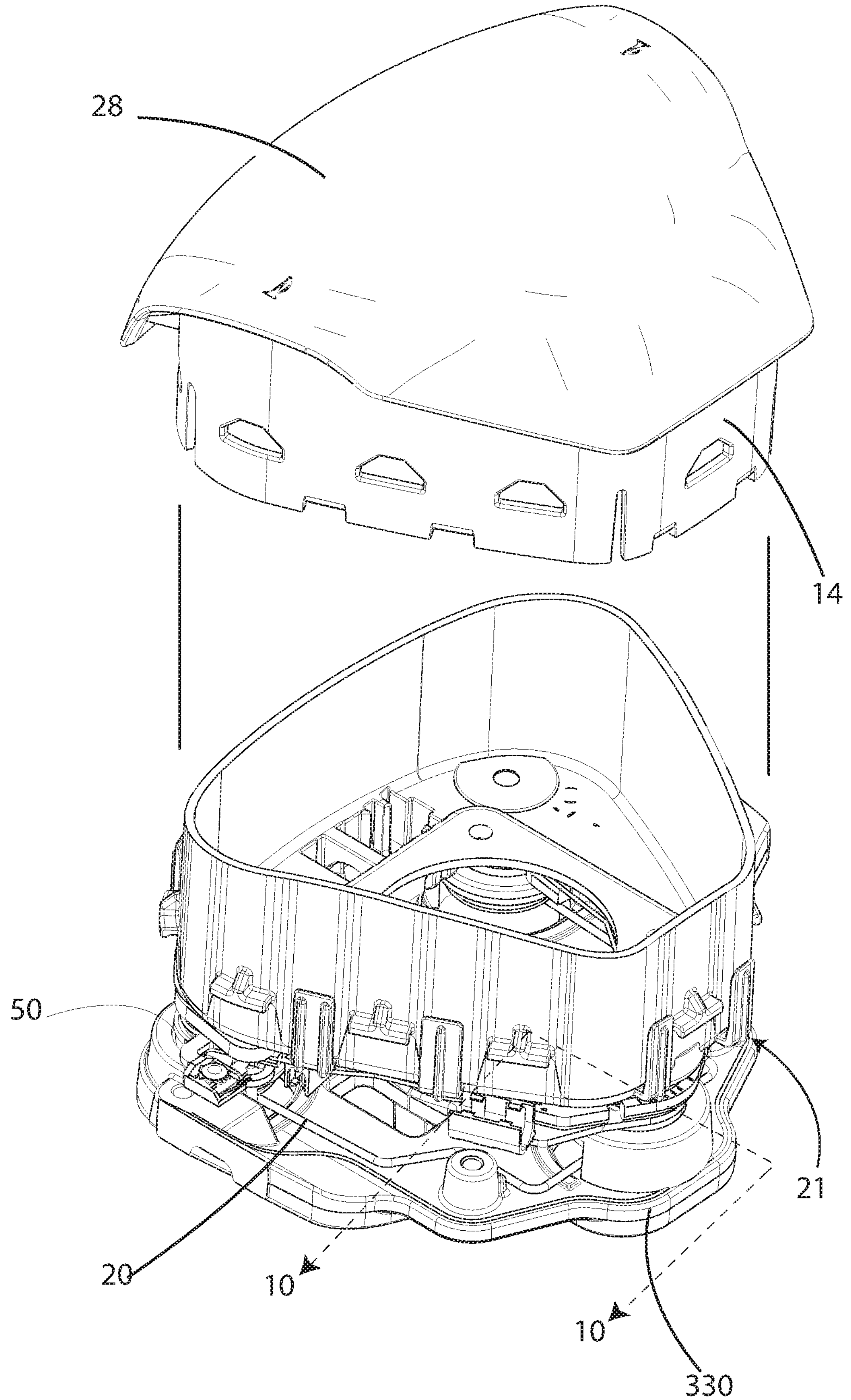
FIG. 9 is a perspective view of the hub plate of a steering wheel armature of FIG. 7, also containing a driver airbag module.
Figure 10:
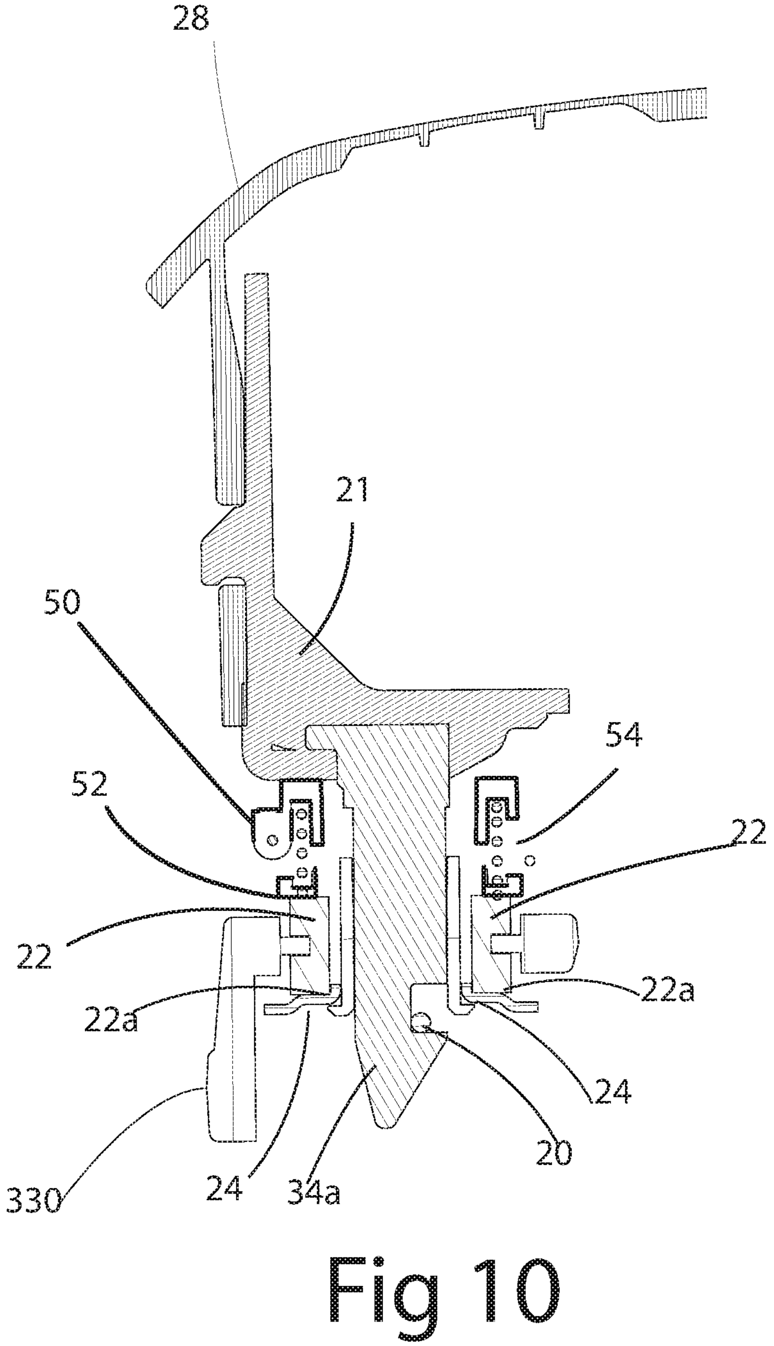
FIG. 10 is a cross-sectional view of the hub plate of a steering wheel armature, damper spring element, damper spring isolator, horn switch, and airbag module of FIG. 9.
Figure 11:
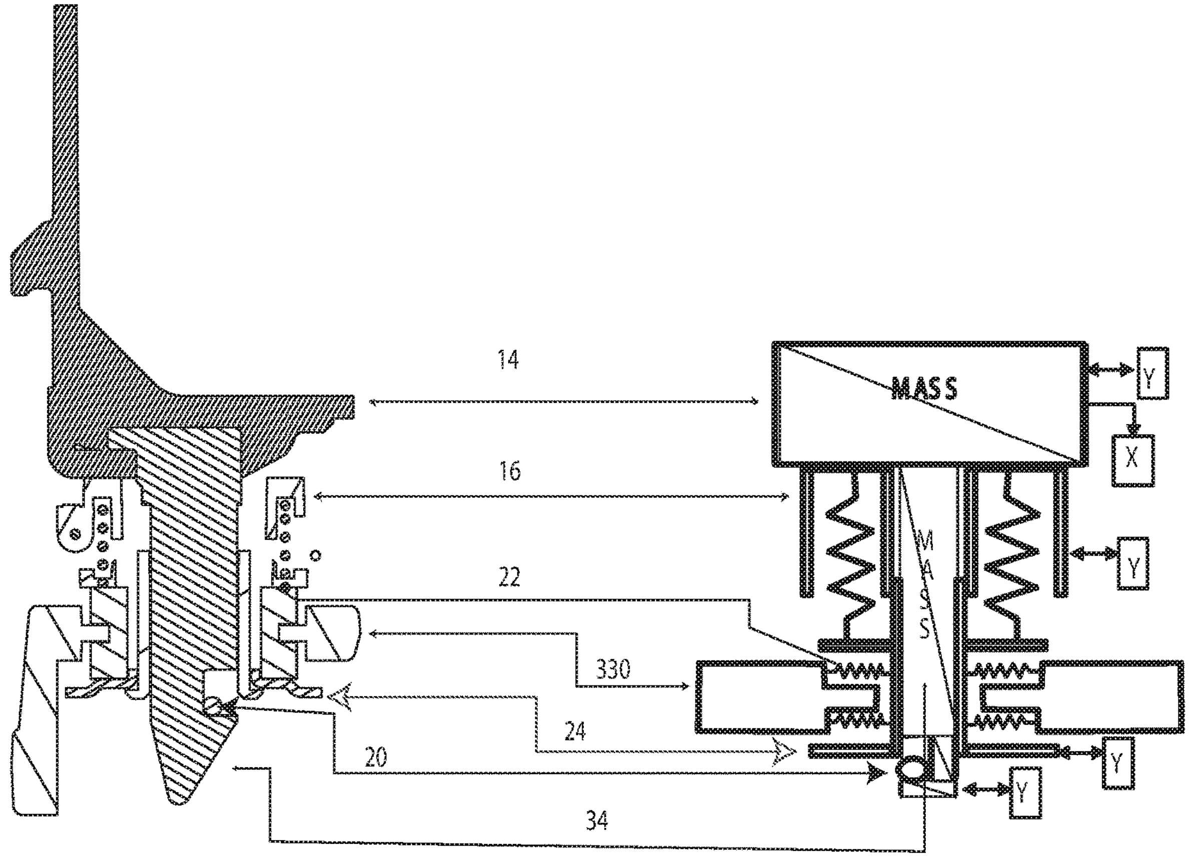
FIG. 11 is a schematic representation of the steering wheel assembly and the driver air bag module as a sprung mass

As shown in FIGS. 1 and 9, for example, an exemplary air bag module 14 includes a cover 28, which is operable to protect an air bag and an associated inflator. The cover 28 is illustrated as somewhat triangular; however, any desired shape, such as a rectangular shape for example, could be employed. Generally, the cover 28 is made from a polymeric material, such as polyester (TPE), but any other suitable material could be used. The cover 28 may be coupled, in a known manner, to a mounting plate 21 to define a cavity for the receipt of the air bag and an inflator. The inflator is operable to deploy the air bag upon the determination of a crash event.

The plate 21, located at a bottom portion of the air bag module 14, may include a central aperture to receive and support a portion of the inflator, a first or upper side, and a second or under side. The top side is generally configured to provide an interface for the air bag and inflator. As shown in FIG. 1, the underside of the plate 21 generally includes a plurality of prongs or pins 34*a-c* for attachment to the steering wheel 18, and a plurality of flanges to couple the plate 21 to a mating element on the cover 28. In this embodiment, the second or under side of the plate 21 includes three pins 34*a-c*, which each include at least one attachment mechanism, such as conically shaped tip, clip, hook or flange, which are each operable to couple the air bag module 14 and the horn switch 16 to the armature 300, as will be described in greater detail below. The pins 34*a-c* may be placed in a number of locations, for example at corners of a virtual rectangle or trapezoid. Arrangement of 3 pins is required for static stability of DAN assembly 28. If desired, four or more such pins can be used depending on the design of steering wheel 18 and the airbag module 14.

The horn switch 16 may include a first switch housing 50 and a second switch housing 52. The first switch housing 50 includes three annular support members 60, each of which includes an opening 76. The second switch housing 52 includes three annular support members 160, coaxially aligned with annular support members 60; each support member 160 includes a complementary opening 176. Each set of aligned openings 76 and 176 receives one of the first, second, and third prongs or pins 34*a-c* and bushings (if used) which effectively increase the diameter of each pin. The first horn switch housing 50 and the second horn switch housing 52 are of an open construction having a number of legs or side portions SOL, 52L, which can be placed at or located about the central portion of the plate.

The openings 76, 176 of the horn switch 16 are operable to receive a respective one of the pins or prongs 34*a-c* to align and couple the first or upper housing 50 to the second housing 52. Further, each support member 60 of the upper switch housing 50 includes an annular groove 86 and each support member 160 of each second or lower switch housing member 52 includes an opposed groove 186 for receipt of a spring 54.

The Horn spring 54 may be any suitable coil spring. The horn spring 54 is of a suitable length and has a spring constant which is sized to displace the first switch housing 50 from the second switch housing 52, and thus the openings 76 of the first switch housing are spaced apart from the openings 176 of the second housing and the exposed portions of switch conductors are moved to a disengaged position. Compression of one or more of the horn springs 54 will cause the exposed section of a wire conductor of the first housing 50 to contact the exposed section of a wire conductor of the second switch housing 52, closing the associated electrical circuit in a known manner.

Figure 2:
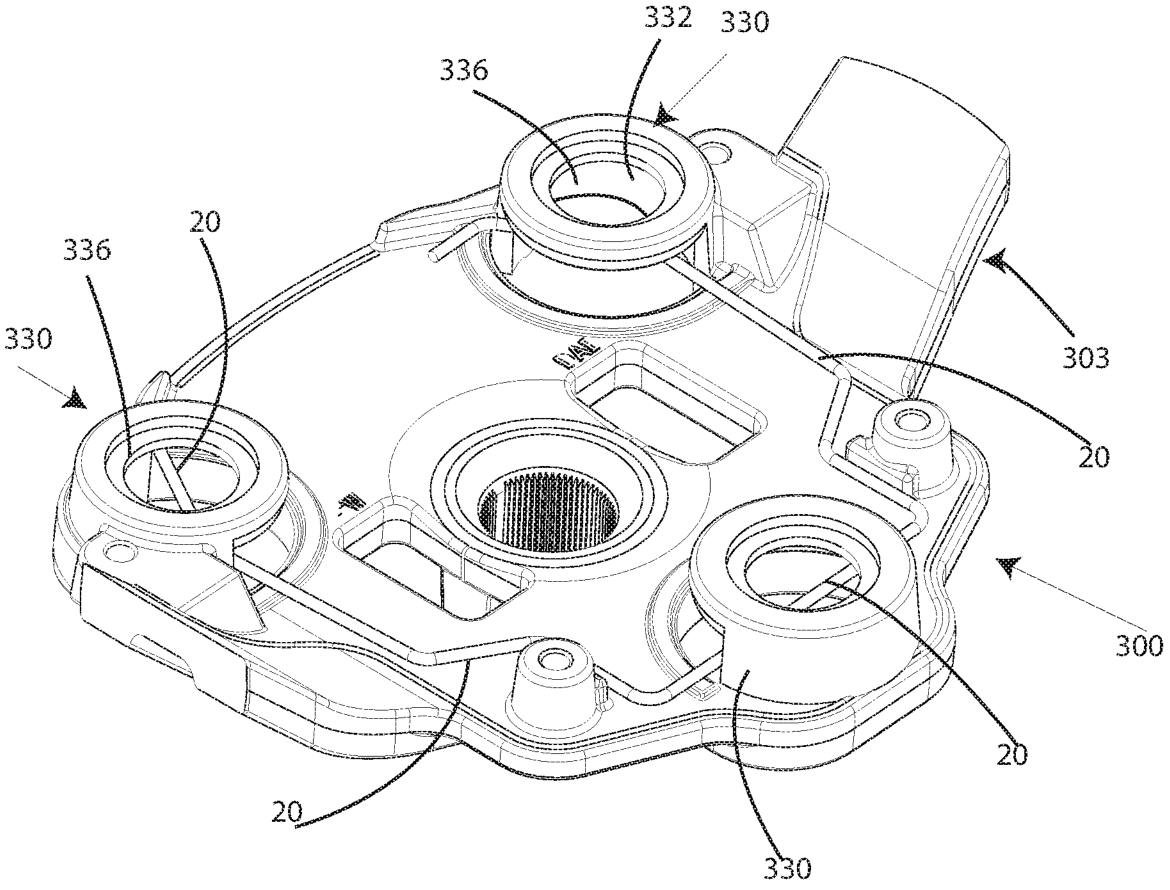
FIG. 2 is a perspective view of the hub plate of an armature of the steering wheel assembly containing a retaining wire.
Figure 4:
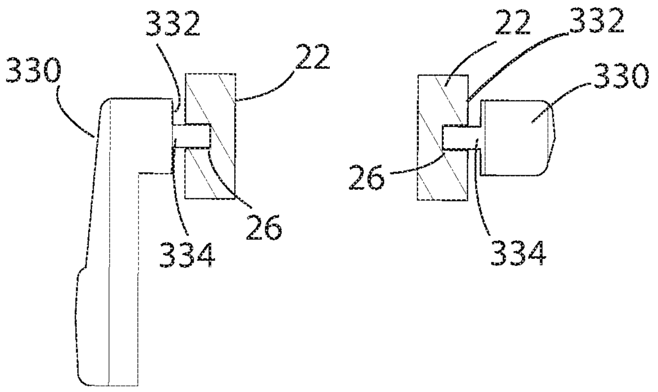
FIG. 4 is a cross-sectional view of the steering wheel armature and damper spring element of FIG. 3.
Figure 3:
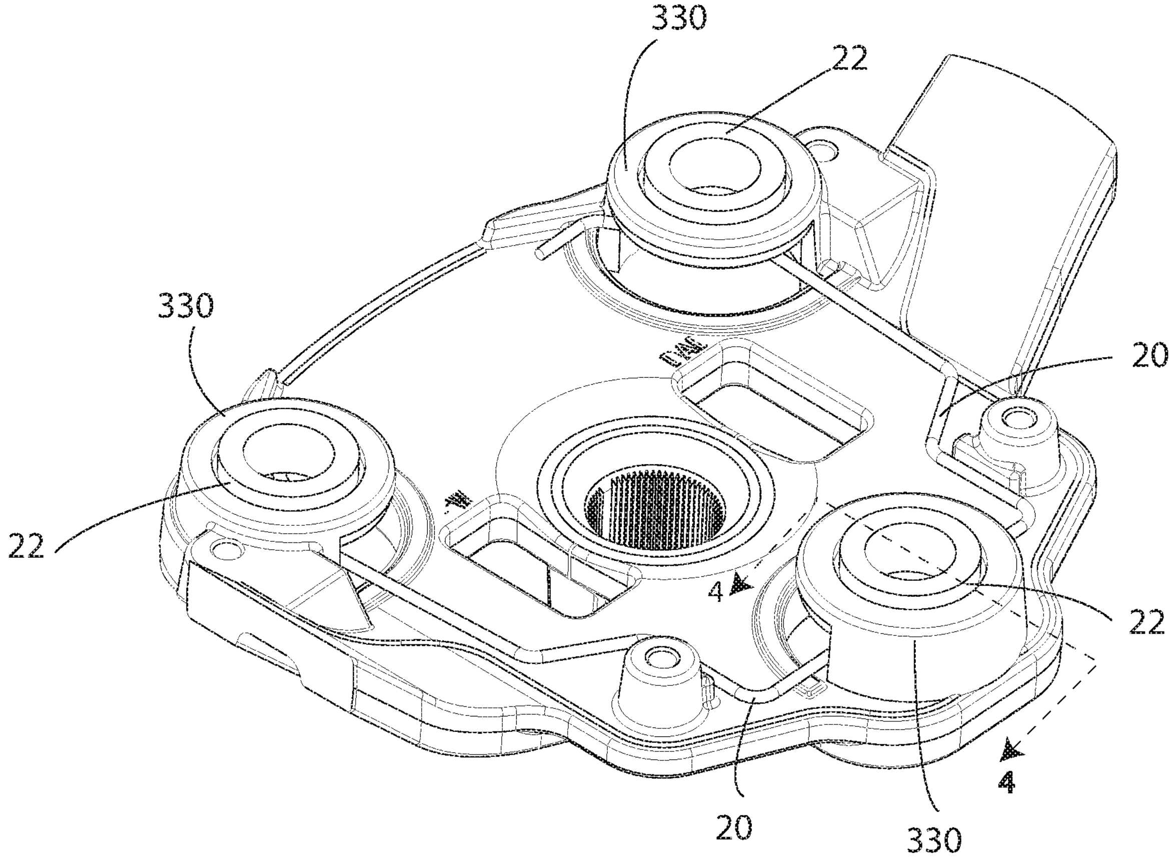
FIG. 3 is a perspective view of the hub plate of a steering wheel armature of FIG. 2, containing damper spring elements or damper springs, in accordance with the present invention.
Figure 6:
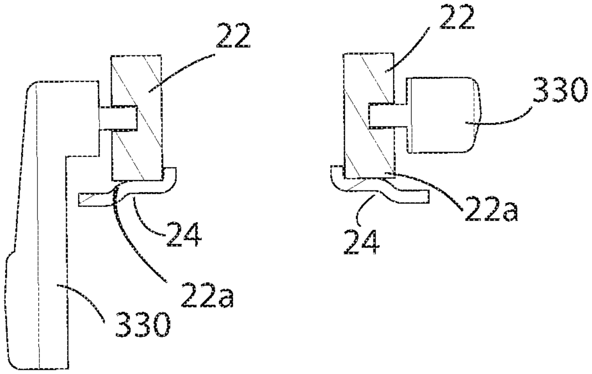
FIG. 6 is a cross-sectional view of the steering wheel armature, damper spring element, and damper spring isolator of FIG. 5
Figure 5:
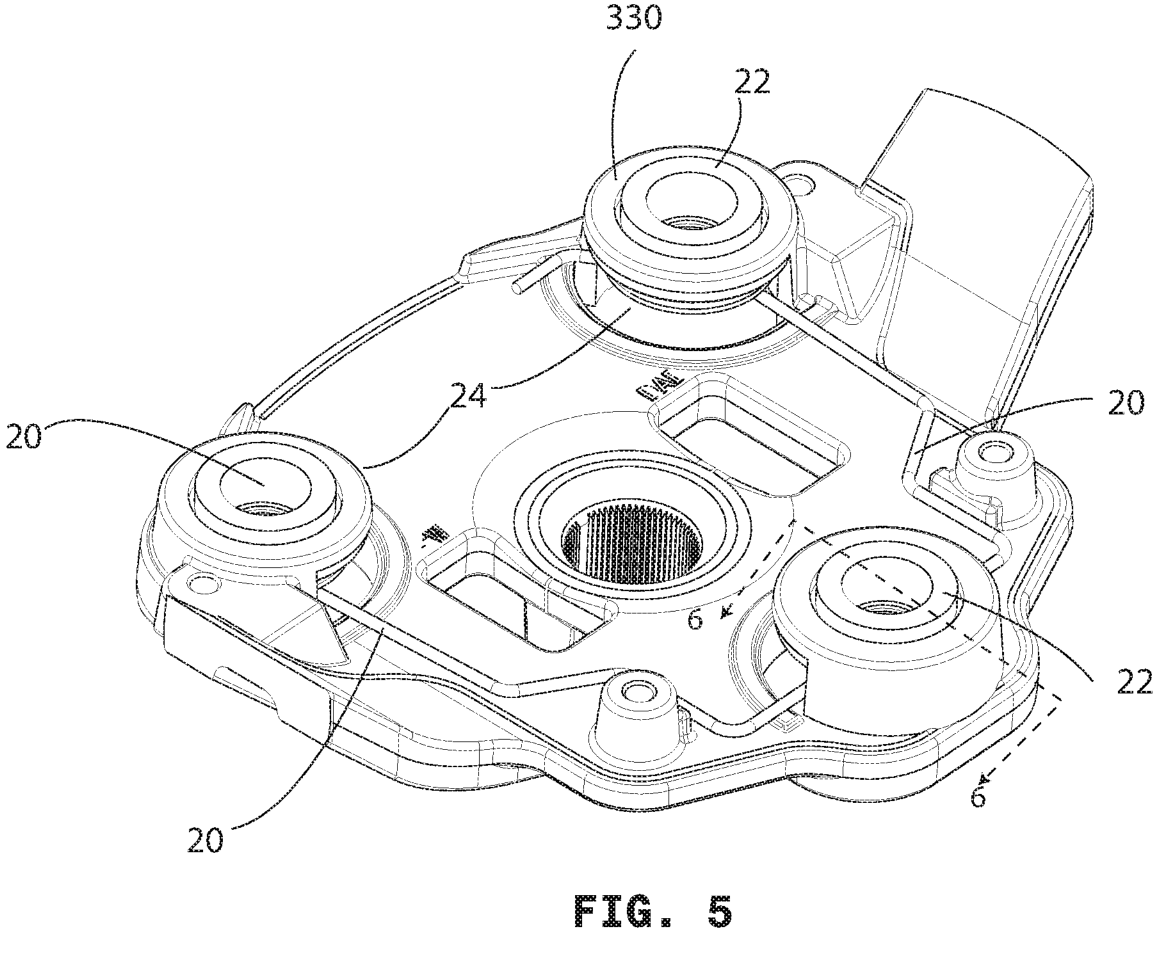
FIG. 5 is a perspective view of the hub plate of a steering wheel armature of FIG. 3, further containing damper spring isolators.

As seen in FIGS. 1 and 2, the wheel 18 includes an armature 300, which is generally comprised of a material, such as magnesium, aluminum or steel. The armature 300 defines a plurality of upraised and annular support members 330, each hollow support member 330 including an opening 336 for receipt of one of the first, second, and third prongs or pins 34*a-c*, and which extend from the airbag module mounting plate 21 to couple the air bag module 14 and horn switch 16 (if used) to the wheel's armature 300. The top of each support member 330 has a flat surface, which may operate or function as an anvil or reaction surface, and receives and/or supports each of the lower housing supports 160 of the lower horn switch housing 52. An inner annular surface 332 is defined as an inner wall of each support member 330. A rib 334 is shown in FIG. 4 circumferentially formed along a median portion of each inner annular surface 332, and interfaces with an outer circumferential groove 26 formed on each damper spring element or grommet 22, for retention of the respective grommet 22 within the corresponding support member 330. The armature 300 may be further configured to include a plurality of first posts, second posts, hooks, or other attachment features (not shown), which are operable to interface with or retain the attachment mechanism 20 as further discussed below. The armature 300 further includes a hub region 302, which has a connector 305 to couple the armature 300 to a steering shaft (not shown) to enable the driver to steer the vehicle in a known manner.

A first embodiment of an attachment mechanism 20 includes a retaining wire (spring clip) 20 resiliently fixed to the hub region 302 of the armature 300. The retaining wire 20 may be one or more components, and is generally composed of a suitable material capable of elastic deformation, including polymers, but typically is composed of a metal such as aluminum or spring steel. The retaining wire 20 is generally integrally formed with a uniform thickness. The wire thickness is generally chosen such that the retaining wire 20 may retain the pins 34*a-c* of the air bag module 14 by being positioned upon a bearing surface formed on the armature 300 and positioned in an engagement slot under each support member 330, as known in the art.

A minimum of three of damper spring elements or grommets 22 are provided wherein each of the damper springs is vertically disposed, retained, and nested within a corresponding support member 330, for dampening of frequencies emanating from the steering shaft (not shown) into the steering wheel assembly 10. In one embodiment, the plurality of damper spring elements or grommets 22 are formed as annular structures, thereby permitting insertion of one of the posts 34*a-c* through each damper spring element or grommet and through each corresponding support member 330, and thereby permitting attachment of the airbag module 14 to the attachment mechanism 20 as the posts 34*a-c* are clipped to the spring clip or retaining wire 20. It will be appreciated that the damper spring elements or grommets 22 may be geometrically formed consistent with the attachment strategy of any given airbag module.

In further accordance with the present invention, the lateral stiffness of the damper spring elements or grommets 22 may be iteratively tuned to obtain a resonant frequency of the mass of the driver air bag module that closely approximates the resonant frequency typically found within the steering wheel assembly 10 as mounted to the vehicle. The geometry and material of the damper spring elements or grommets 22 may therefore contribute to the desired lateral stiffness. Fluoro-silicone is one example of a polymeric material found useful as a grommet material. Other suitable materials having similar engineering or material properties are also contemplated. EPDM rubber (ethylene propylene diene monomer rubber), a type of synthetic rubber, is an elastomer characterized by a wide range of applications. Fluorosilicone rubber is a long-lasting elastomer that is stable and compression set resistant across temperature extremes, but unlike silicone, fluorosilicone contains trifluoropropyl groups that enhance its chemical resistance to non-polar solvents, fuels, oils, acids, and alkaline chemicals. The unique properties of fluorosilicone make it a problem-solving material that widely used in industrial, aerospace, automotive and aviation applications for static sealing and cushioning.

Figure 8:
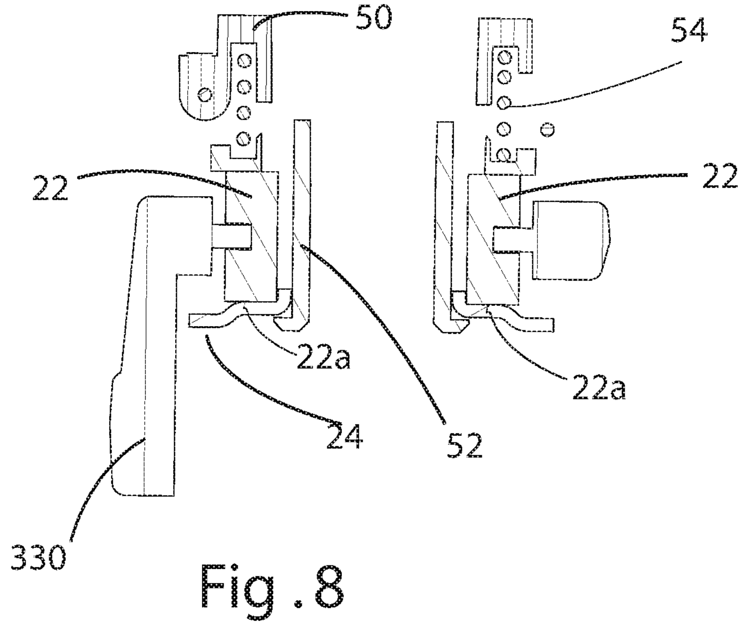
FIG. 8 is a cross-sectional view of the steering wheel armature, damper spring element, damper spring isolator, and horn switch of FIG. 7.
Figure 7:
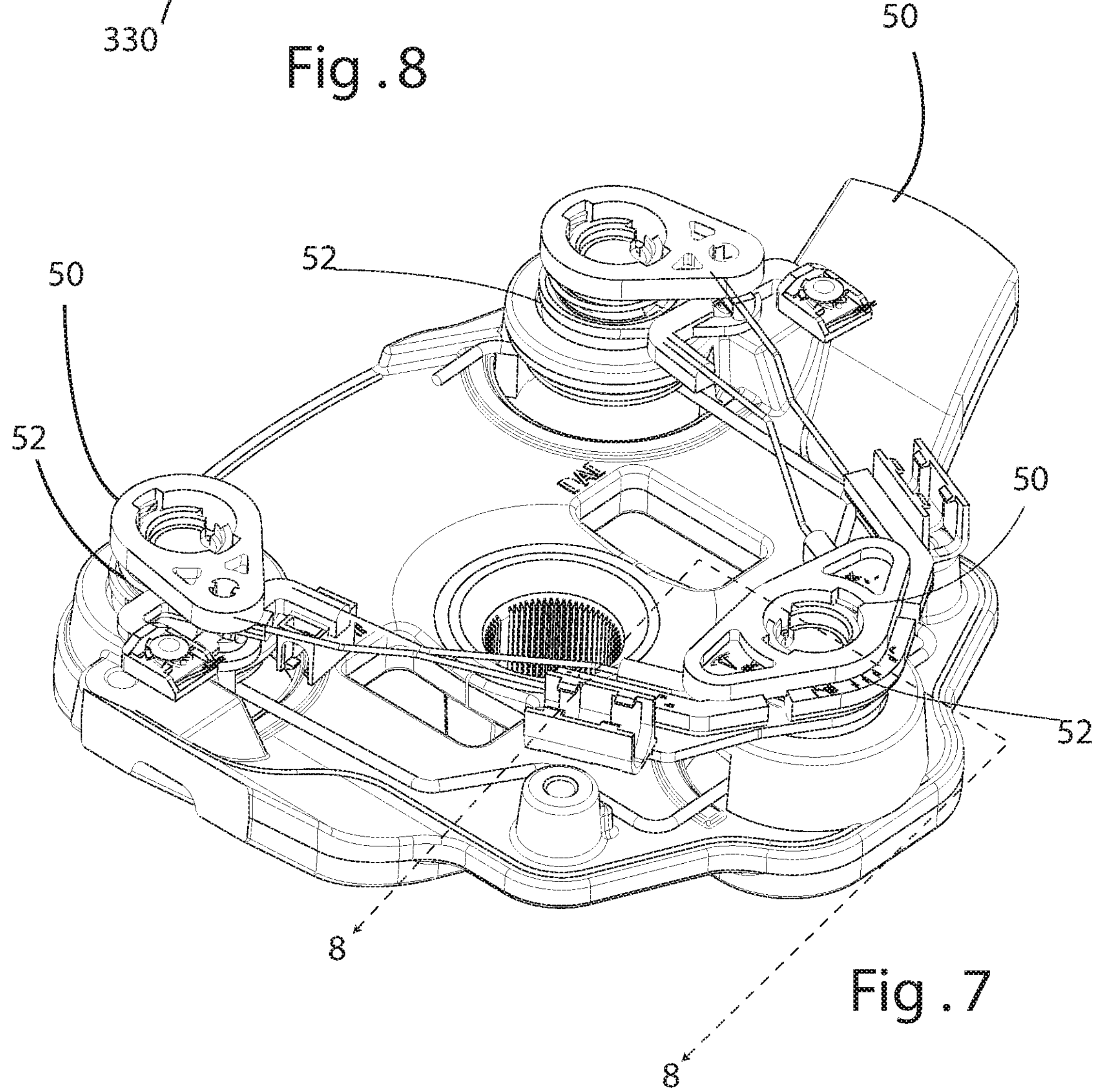
FIG. 7 is a perspective view of the hub plate of a steering wheel armature of FIG. 5, also containing a horn switch.

Accordingly, the lateral stiffness or lateral displacement of the damper spring elements or grommets 22 may be related to the mass of the driver air bag assembly as shown in FIG. 8. The forces acting on the air bag module or assembly relative to lateral displacement Y include: (1) lateral force Fa which equals the vibration force in the armature 300; and (2) lateral force Fb=KBY, wherein Fb=the damper spring elements or grommets 22 Stiffness Force, KB=Damper Spring Stiffness, and Y=lateral displacement. The forces acting on the air bag module or assembly relative to vertical displacement include: (1) F=mg, where m=mass of the driver air bag assembly, and, g=the gravitational constant; and (2) Fk=KSX, where Fk=Horn Spring Stiffness Force, KS=Horn Spring Stiffness, and X=vertical displacement. It will be appreciated that the force attributable to gravity, that is F=mg is designed to be less than or equal to the horn spring stiffness force, Fk=KSX. Taken together, the vertical and lateral forces are managed by the horn springs 16 and damper spring elements or grommets 22, thereby resulting in dampening of the resonant frequency of the steering wheel assembly 10. The following examples illustrate damper spring elements or grommets stiffness calculations relative to the present invention:

By weight, the total mass of the airbag module assembly at 1.075 kg, the number of damper spring elements of three at a stiffness selected for each frequency 20, 30 and 40 Hz at a lateral displacement, the following table results for Fluorosilicone damper spring elements or grommets 22.

| Freq. (Hz) | Mass (kg) | Number of Damper Springs | Stiffness/ Grommet (N/mm) | Displacement (lateral) (mm) | Lateral F/Spring (N) at maximum Displacement |
|---|---|---|---|---|---|
| 20 | 1.075 | 3 | 5.65 | 1.0 | 5.64 |
| 30 | 1.075 | 3 | 12.78 | 1.0 | 12.72 |
| 40 | 1.075 | 3 | 22.59 | 1.0 | 22.59 |

In yet another aspect of the invention, the lateral locators typically used within the horn switch 16, to ensure proper alignment of the horn switch 16 as it is placed within the support members 330, are no longer necessary. Stated another way, the plurality of damper springs or elements 22 also function to locate each annular member 76, 176 of the horn switch 16. Accordingly, upon assembly, and as the horn switch 16 is positioned over the damper spring elements or grommets 22, each of the annular members 76, 176 of the horn switch 16 are coaxially aligned with a corresponding one of the support members 330. As shown in the drawings of FIGS. 3, 4, 6, 7 and 8, once assembled, each of the support members 330 are therefore coaxially aligned with a corresponding one of the annular horn switch members 76, 176, and, a corresponding damper spring element or grommet 22. Once assembled, the lower horn switch housing 52 and the armature 300 together function as a bump stop for the damper spring elements or grommets 22, thereby preferably limiting the lateral damper spring element or grommet movement to one millimeter or less or within allowable strength limits.

As shown in FIGS. 1 and 8, a plurality of damper spring isolators or spacers 24 correspond to the plurality of damper spring elements or grommets 22 and are each resiliently biased between the bottom of the lower switch housing 52 and a bottom portion 22*a* of a respective damper spring element or grommet 22, thereby securing the damper spring element or grommet 22 within the support member 330. The damper spring isolators or spacer 24 aids in the assembly of the Driver Airbag 14 as each spacer 24 allows and aids the retainer wire 20 to slide over and snap on the pin or prong mounting member 34*a*, 34*d*, 34*c*. As shown, each isolator or spacer 24 is spaced laterally from the support that limits the relative movement laterally, thus isolating the damper spring element or grommet 22 to insure it dampens over the entire maximum range of lateral movement in this case 1.0 mm.

As indicated above, the present invention greatly enhances the efficacy of a dampening system, to improve upon the driver comfort, as the steering wheel is gripped during operation of an associated vehicle. By suspending the air bag module 14 over the plurality of damper spring elements or grommets 22 and permitting lateral movement of the air bag module 14, the vibration oftentimes communicated to the steering wheel is mitigated and dampened. In addition, the packaging space needed for the present dampening system is relatively decreased as compared to other known dampeners in the steering wheel systems. Finally, the relative weight of the present dampening system is favorably reduced as compared to other known dampening systems.

The description of the invention is merely exemplary in nature and, thus, variations that do not depart from the gist of the invention are intended to be within the scope of the invention. Such variations are not to be regarded as a departure from the spirit and scope of the invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An assembly comprising:

a steering wheel including a plurality of support members;

a plurality of damper spring elements or grommets, each damper spring element or grommet retained within a corresponding one of said plurality of support members;

an automotive component fixed to said steering wheel and positioned upon said plurality of damper spring elements or grommets;

a plurality of mounting members extending from said automotive component to secure said automotive component to said steering wheel;

an attachment mechanism retainer wire fixed to said plurality of support members, wherein said plurality of mounting members are fixed to said attachment mechanism retainer wire, for fixing said automotive component to said steering wheel; and a horn switch seated upon said plurality of damper spring elements or grommets, and retained between said plurality of damper spring elements or grommets and said automotive component.

2. The assembly of claim 1 wherein each mounting member is extending through a respective one of said plurality of support members and is fixed to said steering wheel.

3. The assembly of claim 1 wherein said automotive component is an airbag module.

4. The assembly of claim 1 further comprising:

a plurality of damper spring isolators or spacers, each of said isolators or spacers positioned between the attachment mechanism retainer wire and a corresponding damper spring element or grommet.

5. The assembly of claim 1 further comprising:

an inner annular surface contained within each support member;

a rib formed on a median portion of each of said inner annular surfaces; and a groove formed on a median portion of an outer periphery of each damper spring element or grommet, wherein said respective rib is mated with said respective groove to retain each of said damper spring element or grommet within each corresponding support member.

6. An assembly comprising:

a steering wheel including a first plurality of annular support members;

a plurality of annular damper spring elements or grommets, each damper spring element or grommet retained within a corresponding one of said first plurality of annular support members;

a horn switch assembly containing an upper switch housing and a lower switch housing, the lower switch housing including a second set of annular support members, wherein each one of the second set of annular support members is fixed over and coaxially aligned with a corresponding one of said plurality of annular damper spring elements or grommets;

an automotive component positioned over said horn switch containing a plurality of mounting members, each mounting member fixed to said steering wheel to secure said automotive component to said steering wheel; and an attachment mechanism retainer wire fixed to said plurality of support members, wherein each of said plurality of mounting members are fixed to said attachment mechanism retainer wire, for fixing said automotive component to said steering wheel.

7. The assembly of claim 6 wherein said automotive component is an airbag module.

8. The assembly of claim 6 further comprising:

a plurality of damper spring isolators or spacers, each of said isolators or spacers positioned between said lower horn switch housing and a corresponding damper spring element or grommet.

9. An assembly comprising:

a steering wheel including a plurality of hollow support members;

a plurality of damper spring elements or grommets, each damper spring element or grommet retained within a corresponding one of said plurality of hollow support members;

an automotive component fixed to said steering wheel and suspended upon said plurality of damper spring elements or grommets;

a plurality of mounting members extending from said automotive component to secure said automotive component to said steering wheel; and an attachment mechanism retainer wire biased against said plurality of hollow support members, wherein each of said plurality of mounting members are fixed to said attachment mechanism retainer wire, for fixing said automotive component to said steering wheel.

10. The assembly of claim 9 wherein each mounting member is extending through a corresponding one of said plurality of hollow support members and is fixed to said steering wheel.

11. The assembly of claim 9 further comprising:

a horn switch seated upon said plurality of damper spring elements or grommets, and retained between said plurality of damper spring elements or grommets and said automotive component.

12. The assembly of claim 11 further comprising:

a plurality of damper spring element isolators or spacers, each of said isolators or spacers positioned between a lower horn switch housing and a corresponding damper spring element or grommet.

13. The assembly of claim 9 wherein said automotive component is an airbag module.

14. The assembly of claim 9 wherein said plurality of damper spring elements or grommets comprise a plurality of damper springs.

15. The assembly of claim 9 wherein each of said plurality of hollow support members has an annular surface, and each of said damper spring elements or grommets have a corresponding circumferential periphery for mating with one of said annular surfaces.

16. The assembly of claim 15 further comprising:

an inwardly radially extending ledge or rib formed on each of said annular surfaces; and an inwardly radially extending groove formed on each of said circumferential peripheries for mating with one of said inwardly radially extending ledges or ribs, thereby retaining a respective one of said plurality of damper spring elements or grommets within a corresponding one of said plurality of hollow support members.

* * * * *